(12) United States Patent
Van Noy et al.

(10) Patent No.: US 12,036,833 B2
(45) Date of Patent: Jul. 16, 2024

(54) MULTI-MODAL FREIGHT SYSTEMS, DEVICES, AND METHODS

(71) Applicant: AVBJ, LLC, Lehi, UT (US)

(72) Inventors: Andrew Van Noy, Lehi, UT (US); Braden Jones, Lehi, UT (US); Kevin Anjel Damoa, Auberry, CA (US)

(73) Assignee: AVBJ, LLC, Lehi, UT (US)

( * ) Notice: Subject to any disclaimer, the term of this patent is extended or adjusted under 35 U.S.C. 154(b) by 0 days.

(21) Appl. No.: 18/137,143

(22) Filed: Apr. 20, 2023

(65) Prior Publication Data

US 2023/0339274 A1 Oct. 26, 2023

Related U.S. Application Data

(60) Provisional application No. 63/407,041, filed on Sep. 15, 2022, provisional application No. 63/333,025, filed on Apr. 20, 2022.

(51) Int. Cl.
| | | |
|---|---|---|
| *B60F 1/04* | (2006.01) | |
| *B61C 9/00* | (2006.01) | |
| *B61D 3/00* | (2006.01) | |
| *B62D 53/08* | (2006.01) | |

(52) U.S. Cl.
CPC ............ *B60F 1/046* (2013.01); *B61C 9/00* (2013.01); *B61D 3/005* (2013.01); *B62D 53/08* (2013.01); *B60F 2301/00* (2013.01)

(58) Field of Classification Search
CPC ........ B60F 1/046; B60F 2301/00; B60F 1/00; B60F 1/005; B60F 1/02; B60F 1/04; B60F 1/043; B61C 9/00; B61D 3/005
See application file for complete search history.

(56) References Cited

U.S. PATENT DOCUMENTS

| | | | | |
|---|---|---|---|---|
| 2,913,131 A | * | 11/1959 | Holmes | B60P 3/125 |
| | | | | 280/493 |
| 2,915,989 A | * | 12/1959 | Hoppe | B60F 1/005 |
| | | | | 105/72.2 |

(Continued)

FOREIGN PATENT DOCUMENTS

| | | | |
|---|---|---|---|
| CA | 2741315 C | | 7/2013 |
| CN | 106926690 A | * | 7/2017 |

(Continued)

OTHER PUBLICATIONS

PCT Invitation to Pay Additional Fees from Corresponding PCT Application No. PCT/US2023/019250, dated Aug. 1, 2023.

*Primary Examiner* — Zachary L Kuhfuss
*Assistant Examiner* — Cheng Lin
(74) *Attorney, Agent, or Firm* — Workman Nydegger

(57) ABSTRACT

A freight vehicle is provided including a set of road wheels configured for road traversal; a set of rail wheels configured for rail traversal, the set of rail wheels being separate from the set of road wheels; and an actuation system configured to modify a relative positioning of the set of road wheels and the set of rail wheels to facilitate operation of the freight vehicle according to a plurality of operational modes. The plurality of operational modes include a road traversal mode wherein the actuation system causes the set of road wheels to contact a road and a rail traversal mode wherein the actuation system causes the set of rail wheels to contact a rail.

25 Claims, 8 Drawing Sheets

(56) References Cited

U.S. PATENT DOCUMENTS

| | | | | |
|---|---|---|---|---|
| 3,892,187 | A | * | 7/1975 | White, Jr. ............... B61C 15/00 |
| | | | | 105/215.2 |
| 4,685,399 | A | | 8/1987 | Baker |
| 4,887,535 | A | | 12/1989 | Mangone |
| 5,009,169 | A | * | 4/1991 | Viens ....................... B60F 1/00 |
| | | | | 105/72.2 |
| 6,021,719 | A | | 2/2000 | Kershaw, Jr. |
| 8,428,796 | B2 | | 4/2013 | Donnelly |
| 10,802,496 | B2 | * | 10/2020 | Lampley ................ G08C 17/02 |
| 10,831,215 | B2 | | 11/2020 | Giegel |
| 11,046,515 | B2 | | 6/2021 | Luckinbill et al. |
| 2019/0300024 | A1 | | 10/2019 | Wei et al. |
| 2021/0370994 | A1 | | 12/2021 | Soule et al. |
| 2021/0380150 | A1 | | 12/2021 | Soule et al. |
| 2022/0355635 | A1 | * | 11/2022 | Pollock .................... B60F 1/04 |

FOREIGN PATENT DOCUMENTS

| | | | | |
|---|---|---|---|---|
| CN | 107053979 | B | | 7/2019 |
| DE | 19727289 | A1 | | 1/1999 |
| DE | 19844024 | A1 | * | 4/2000 ............. B60F 1/043 |
| FR | 2696699 | A1 | | 4/1994 |
| FR | 2818930 | A1 | * | 7/2002 ............. B60F 1/043 |
| WO | WO-2017083888 | A2 | * | 5/2017 ............. B60F 1/043 |
| WO | 2017207978 | A1 | | 12/2017 |
| WO | WO-2018090709 | A1 | * | 5/2018 ................ B60F 1/00 |

\* cited by examiner

MULTI-MODAL FREIGHT SYSTEMS, DEVICES, AND METHODS

CROSS-REFERENCE TO RELATED APPLICATIONS

This application claims the benefit of and priority to U.S. Provisional Patent Application Ser. No. 63/333,025 filed Apr. 20, 2022, and entitled "Freight Moving System and Method," and to U.S. Provisional Patent Application Ser. No. 63/407,041 filed Sep. 15, 2022, and entitled "Multi-Modal Freight Systems", both of which are expressly incorporated herein by reference.

FIELD OF THE DISCLOSURE

The present disclosure relates to components of freight systems and methods and apparatuses for controlling freight systems, including freight vehicles that are configured to operate in roadway traversal and railway traversal modes while interacting with trailers designed for road traversal (e.g., semitrailers).

BACKGROUND

Various modalities exist for transporting goods, materials, and/or products. For land transportation, such modalities include shipping by train and shipping by semitruck. Although shipping by train can be much cheaper than shipping by semitruck, shipping by train is typically associated with a longer transit time in view of the time associated with the sorting and/or assembling of train cars in (often congested) railyards prior to transportation. In contrast, semitrucks individually carry a much smaller payload, thereby reducing pre-transit processing time.

Because semitrucks carry a much smaller payload than trains, the cost of labor (i.e., drivers) amounts to a significant expense associated with shipping by semitruck. The cost of labor for shipping by semitruck is exacerbated by generational/cultural shifts in the truck driver demographic, with fewer truckers being willing to fulfill long-haul trucking needs. Autonomous vehicle technology has received significant attention in recent years, with the focus of many directed toward automating the process of shipping by semitruck. However, significant governmental and regulatory obstacles exist that impede the implementation of autonomous shipping by semitruck on public roads.

SUMMARY

At least one embodiment provides a freight vehicle, comprising: a set of road wheels configured for road traversal; a road motor system configured to drive the set of road wheels to facilitate road traversal; a set of rail wheels configured for rail traversal, the set of rail wheels being separate from the set of road wheels; a rail motor system, the rail motor system being separate from the road motor system, the rail motor system being configured to drive the set of rail wheels to facilitate rail traversal; and an actuation system configured to modify a relative positioning of the set of road wheels and the set of rail wheels to facilitate operation of the freight vehicle according to a plurality of operational modes, the plurality of operational modes comprising: a road traversal mode wherein the actuation system causes the set of road wheels to contact a road and causes the set of rail wheels to refrain from contacting the road, and wherein the road motor system drives the set of road wheels to facilitate traversal of the road; and a rail traversal mode wherein the actuation system causes the set of rail wheels to contact a rail and causes the set of road wheels to refrain from contacting the rail, and wherein the rail motor system drives the set of rail wheels to facilitate traversal of the rail.

DETAILED DESCRIPTION OF VARIOUS EMBODIMENTS

Figure 1A:
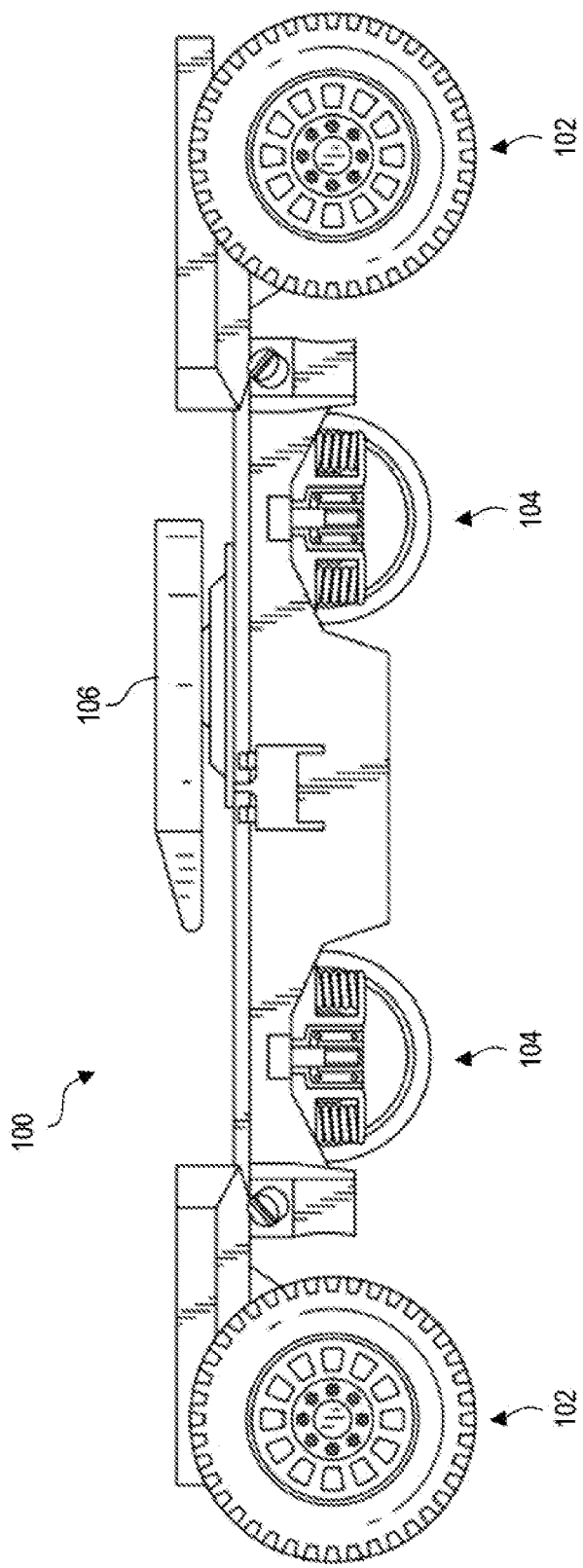
FIGS. 1A and 1B illustrate an example of a freight vehicle configured in different operational modes.

The inventive concepts of the present disclosure will be described below with reference to embodiments and with reference to the drawings. But the claimed invention is not limited thereto. The drawings described are only schematic and are non-limiting in scope. In the drawings, the size of some of the elements may be exaggerated and not drawn to scale; this is for ease of illustration. The dimensions and relative dimensions do not necessarily correspond to practical embodiments of the invention.

Furthermore, the terms first, second, third and the like may be used for distinguishing between similar elements and not necessarily for describing a sequential or chronological order. The terms are interchangeable under appropriate circumstances and the embodiments of the invention can be practiced in sequences other than those described or illustrated herein.

The terms "topmost," "upper," "bottommost," "lower," "above," "below," and the like in the description and in the claims are also used for purposes of example and are not necessarily used to describe relative positions. These terms are interchangeable under appropriate circumstances and the embodiments of the invention described herein can be practiced in other orientations than described or illustrated herein.

In addition, the various embodiments which may be described as "preferred embodiments" are to be construed as merely illustrative of ways and modes for carrying out the invention and not as limitations on the scope of the invention.

The terms "comprising", "including", or "having" as used in the claims should not be interpreted as being limited to the means or steps mentioned thereafter. The terms are to be interpreted as specifying the presence of the stated features, elements, steps or components as referred to, but do not preclude the presence or addition of one or more other features, elements, steps or components, or groups thereof. Thus, the scope of the expression "an apparatus or device comprising means A and B" should not be taken as being limited to an apparatus or device consisting only of components A and B. It is intended that for the purposes of this disclosure, only the parts A and B of the device are specifically mentioned, but the claims should be further construed to include equivalents of these parts.

As noted above, transportation/shipping of goods and/or materials by semitruck is often faster than transportation/shipping of such goods by train. However, shipping by semitruck is more costly, with chief costs being the cost of labor (i.e., semitruck drivers) and fuel. Autonomous driving of semitrucks on public roads (in particular across multiple jurisdictions) is associated with numerous challenges and governmental/regulatory hurdles.

In contrast with public roadways, railways are often owned by private/public, non-governmental entities. As noted above, significant time is expended in trainyards to sort and/or assemble train cars for transportation over railways. This delay results in significant time periods in which railways go unused.

At least some disclosed embodiments provide novel systems and/or methods that improve upon existing modalities for shipping goods and/or materials over land. At least some disclosed embodiments provide freight vehicles that are able to transport shipping containers, trailers, or vessels in at least two operational modes: a road traversal mode and a rail traversal mode. Such freight vehicles may connect to and transport mobile shipping containers, trailers, or vessels that are ordinarily transported over roadways, such as semitrailers that include at least one rear axle and that are typically connected to and transported by semi-tractors.

For example, a semitruck driver may deliver a semitrailer pulled by a semi-tractor over a roadway to a predefined roadway delivery location. A pair of freight vehicles may then approach the semitrailer in a road traversal mode and connect to the semitrailer over the roadway. After such connection, the freight vehicles may transport the semitrailer in the road traversal mode to an intersection with a railway (e.g., a graded/paved roadway-railway crossing), or to a forked rail line. The freight vehicles may then transition to the rail traversal mode to enable transportation of the semitrailer over the railway to another roadway-railway crossing (e.g., in another city or other predefined destination area). The freight vehicles may then revert to the road traversal mode and transport the semitrailer to a roadway pickup location. After disconnection of the freight vehicles from the semitrailer at the roadway pickup location, a semitruck driver may obtain the semitrailer and transport it to its final location. Throughout the process, the freight vehicles may advantageously operate in an autonomous and/or semi-autonomous manner and even more advantageously via electric battery power, traditional fuel, or alternative power source.

The principles discussed herein may provide various benefits over conventional overland shipping modalities. For example, as noted above, delays and/or congestion associated with shipping by train results in significant amounts of unused railway time. Implementation of the principles discussed herein may beneficially increase the amount of rail utilization in a manner that promotes economic activity. Furthermore, as noted above, because railways are often privately owned, usage of autonomous locomotion on such railways may face fewer governmental and/or regulatory hurdles, enabling ready implementation of autonomous vehicle technology.

To facilitate such functionality, in an example implementation, stations may be utilized at strategic choke point locations at crossroads of stretches of roadways and railways. Stations can have a direct connection to rail systems via forked rail lines running to property or graded/paved/concrete rail crossings. The stations can house multiple freight vehicles, and the stations can serve as a refueling or charging location for the freight vehicles (freight vehicles as described herein may be implemented as fossil fuel, electric, fuel cell, and/or other types of vehicles). Stations may include renewable energy sources (e.g., wind, solar, geothermal, etc.) and/or be grid-connected. In some instances, such stations may additionally act as publicly accessible charging stations for other consumer electric or fuel cell vehicles.

The stations may serve as drop-off and pickup locations for semitrailers. For instance, an entity seeking shipment of a loaded semitrailer from a first city to a second city may schedule drop-off of the semitrailer at a first station in the first city. A local semi driver may deliver the semitrailer to the first station, and autonomous freight vehicles may connect to and transport the semitrailer to a second station in the second city (traversing a railway for at least part of the transportation). A local semi driver may then pick up the semitrailer from the second station in the second city to deliver the semitrailer to a final location.

The principles described herein are not limited to drop-off and pick-up of semitrailers at formal domiciles or stations. For instance, freight vehicles as described herein may be configured to pick up or drop off semitrailers at or proximate to any railway-roadway crossing.

As noted above, freight vehicles may be implemented as autonomous electric or fuel cell vehicles (e.g., hydrogen fuel cell vehicles). The freight vehicles may include communication systems and/or sensors to enable freight vehicles to autonomously operate in a coordinated manner. Information such as location, speed, battery usage/availability, state/status, timeframes and/or ordering for loading and/or off-loading may be tracked in a centralized and/or decentralized manner. By operating in an autonomous manner as described herein, roadway traffic (particularly highways between major cities) may be reduced via additional transportation of freight over railways, roadway and merchandise safety may be improved by reduced transportation of freight over public roadways, damage to freight vehicles and/or merchandise may be reduced by mitigating reliance on human attentiveness and/or adherence to procedures/protocols. Furthermore, relative to conventional overland shipping modalities, fuel costs associated with shipping may be reduced (e.g., via a reduced start/stop locomotion enabled by railway traversal), labor costs associated with shipping may be reduced (e.g., by allowing automation of the "long-haul" aspects of shipping), and shipping speed may be increased (e.g., at least some public requirements for shipping over public roadways may be avoided, such as public weigh stations or other department of transportation (DOT) regulations governing freight and/or trucking hours of service).

Although the present disclosure focuses, in at least some respects, on implementing the freight vehicles described herein in an autonomous manner, the freight vehicles described herein may be implemented as human-operated vehicles (e.g., whether by human-present control or remote control).

FIG. 1A illustrates a side view of an example freight vehicle 100, in accordance with implementations of the present disclosure. As shown in FIG. 1A, the freight vehicle includes a set of road wheels 102, which may enable the freight vehicle 100 to traverse various roadway conditions (e.g., paved roads, dirt roads, etc.). In some instances, the road wheels of the set of road wheels 102 comprise airless, rubber, low-speed tires (though other types of road tires are within the scope of the present disclosure).

The road wheels of the set of road wheels 102 may be driven by a road motor system to facilitate road traversal. The road motor system may take on various forms. For example, the road motor system may be implemented as a conventional engine, transmission, clutch, and differential axle assembly system. In some implementations, the road motor system includes respective in-wheel motors for at least some (or all) of the road wheels of the set of road wheels 102. In some instances, by utilizing in-wheel motors, conventional heavy and/or space-consuming transmission and/or inter-wheel axle and/or steering systems may be omitted, with each in-wheel motor being associated with its own respective axle, steering mechanism, and gearbox. Furthermore, in some instances, utilizing in-wheel motors may enable individualized steering and torque-vectoring functionality to facilitate improved maneuverability of the freight vehicle 100 (e.g., even allowing the freight vehicle 100 to rotate in place, travel sideways, etc.).

Vibrations associated with vehicle operation over public roadways at conventional speeds are typically regarded as an obstacle to the implementation of in-wheel motors on consumer vehicles, in particular because the vibrations can quickly wear the in-wheel component of in-wheel motors. However, in some implementations, a freight vehicle 100 as disclosed herein will typically operate over roadways at low speeds to perform pick up and drop off functions (e.g., to pick up and/or drop off freight trailers over well-maintained road conditions, which may be privately owned/maintained), thus insulating in-wheel motors of freight vehicles 100 from high-speed vibration conditions.

In the example of FIG. 1A, the freight vehicle 100 also includes a set of rail wheels 104 that is separate from the set of road wheels 102. The set of rail wheels 104 may be driven by a rail motor system to facilitate rail traversal. In some implementations, the rail motor system is separate from the road motor system. For example, the rail motor system may include in-wheel motors for at least some (or all) of the rail wheels of the set of rail wheels 104. In this regard, in some instances, a freight vehicle 100 includes one set of in-wheel motors for its road wheels 102 and one set of in-wheel motors for its rail wheels 104. Vibrational concerns associated with implementation of in-wheel motors can be significantly ameliorated when utilizing in-wheel motors to operate rail wheels to facilitate freight vehicle rail traversal.

Figure 1B:
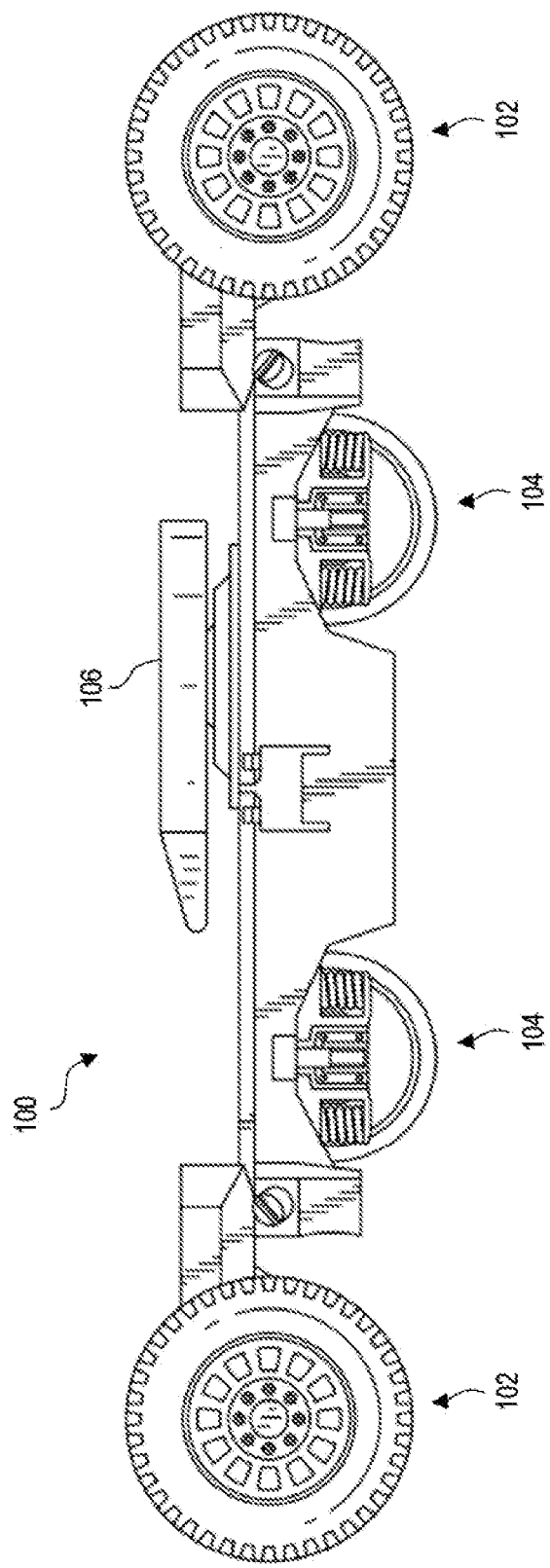

The freight vehicle 100 of FIG. 1A is configured to operate in a plurality of operational modes, including a road traversal mode and a rail traversal mode. FIG. 1A illustrates the freight vehicle 100 in a road traversal mode, with the set of road wheels 102 in a descended state relative to the set of rail wheels 104 to enable the set of road wheels 102 to contact a road surface to enable road traversal. FIG. 1B illustrates the freight vehicle in a rail traversal mode, with the set of rail wheels 104 in a descended state relative to the set of road wheels to enable the set of rail wheels to contact a railway to enable rail traversal.

To facilitate selective switching between the road traversal mode and the rail traversal mode, the freight vehicle 100 includes an actuation system configured to modify the relative positioning of the set of road wheels 102 and the set of rail wheels 104. The actuation system may operate in a variety of ways to facilitate such changes in relative positioning of the set of road wheels 102 and the set of rail wheels. For example, each road wheel of the set of road wheels 102 may include a respective independent suspension (e.g., double wishbone, multi-link, MacPherson, transverse leaf-spring, etc.), and the actuation system may actuate the respective independent suspension of each road wheel to facilitate selective raising and/or descending of the road wheels 102. Such actuation may be facilitated by one or more linear actuators, rotary actuators, hydraulic actuators, pneumatic actuators, electric actuators, and/or other types of actuators in mechanical communication with the independent suspension of one or more of the road wheels 102.

As another example, each road wheel of the set of road wheels may include a respective air suspension system, and the actuation system of the freight vehicle 100 may control the respective air suspension systems to facilitate selective ascension and/or descension of the road wheels 102 (e.g., to enable switching between the road traversal mode and the rail traversal mode.

As yet another example, rather than directly actuating the road wheels 102, the actuation system may act upon the set of rail wheels 104 to displace the rail wheels 104 relative to the road wheels to enable switching between the road traversal mode and the rail traversal mode (e.g., the road wheels 102 may be fixed to a frame of the freight vehicle 100, and the actuation system may operate to descend or raise the rail wheels 104).

The freight vehicle 100 of FIGS. 1A and 1B also includes a wheel connection system 106, which may be a fifth wheel connection system configured to receive a kingpin of a trailer (e.g., a semitrailer). For example, while operating in the road traversal mode, the freight vehicle 100 may reverse toward a semitrailer to enable the kingpin of the semitrailer to enter a capture zone on a skid plate of the fifth wheel connection system 106 and become secured by a locking jaw of the fifth wheel connection system 106 (e.g., to allow the freight vehicle 100 to pick up the semitrailer from a designated pickup location).

The locking jaw of the fifth wheel connection system 106 may be motorized to enable autonomous disconnection of the fifth wheel connection system 106 from the kingpin of the semitrailer to enable (e.g., upon delivering the semitrailer to a desired destination). Furthermore, the freight vehicle 100 may include appropriate sensor and/or controller components to facilitate autonomous connection of the fifth wheel connection system 106 to a kingpin of a trailer (and/or autonomous locomotion of the freight vehicle 100 before and/or after such connection). For example, a freight vehicle 100 may comprise or be in communication with image sensors (e.g., visible light, infrared image sensors, and/or others), depth detection systems (e.g., time-of-flight systems, stereoscopic depth detection systems, LIDAR systems, and/or others), interoceptive sensors (e.g., inertial measurement units (IMUs), magnetometers, accelerometers, gyroscopes, etc.), ultrasonic sensors, navigation systems (e.g., radio-based positioning systems, such as GPS systems), artificial intelligence module(s) (e.g., decision modules, computer vision modules such as object/feature detection modules, simultaneous localization and mapping (SLAM) modules, etc.), and/or other components for facilitating autonomous connection to the trailer and/or autonomous locomotion.

Figure 2A:
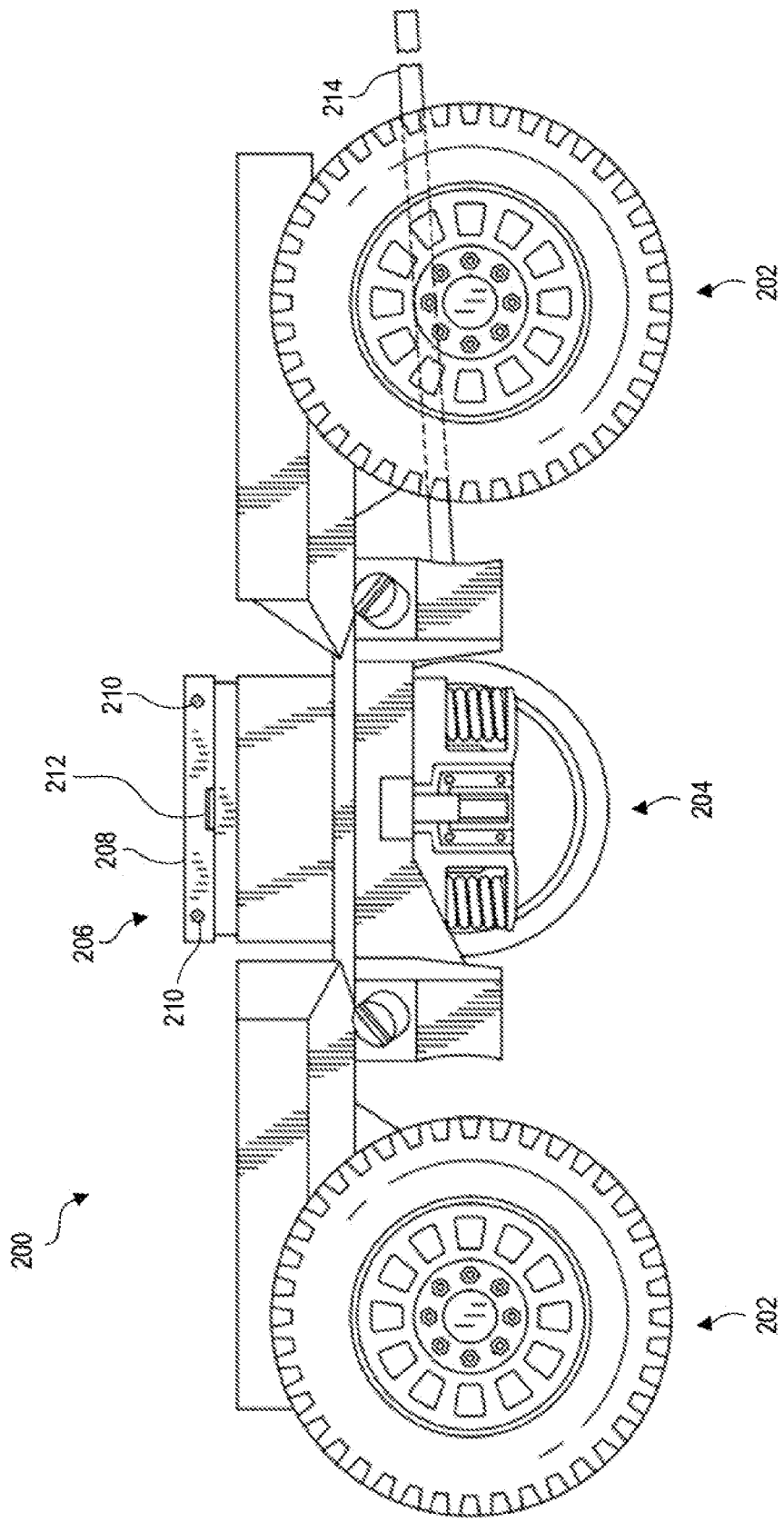
FIGS. 2A and 2B illustrate another example of a freight vehicle configured in different operational modes.

FIG. 2A illustrates another example of a freight vehicle 200, in accordance with implementations of the present disclosure. The freight vehicle 200 of FIG. 2A may include many components/features similar to those discussed hereinabove with reference to the freight vehicle 100 of FIGS. 1A and 1B. For instance, the freight vehicle 200 may include a set of road wheels 202, a road motor system for driving the road wheels 202, a set of rail wheels 204, a rail motor system for driving the rail wheels 204, and an actuation system for selectively switching between a road traversal mode (shown in FIG. 2A) and a rail traversal mode (shown in FIG. 2B).

Figure 2B:
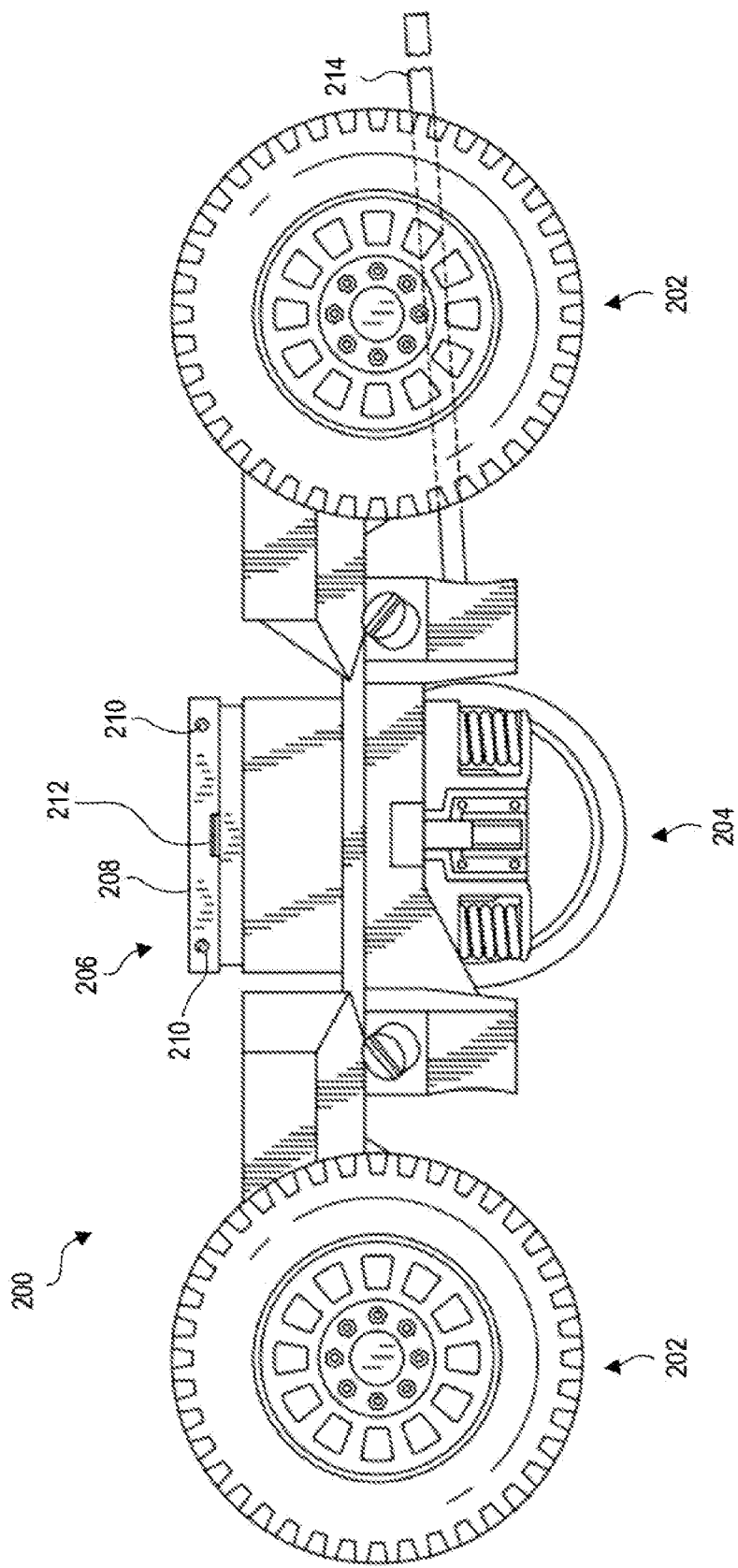

As shown in FIGS. 2A and 2B, the freight vehicle 200 includes a trailer lift system 206, which may enable the freight vehicle 200 to lift a part of a trailer (e.g., a part of a trailer that is separate from the kingpin of the trailer). For example, the trailer lift system 206 may enable the freight vehicle 200, while operating in the road traversal mode, to lift a trailer from an underside of the trailer.

The trailer lift system 206 may include various components and may operate in a variety of ways. For example, in the example of FIGS. 2A and 2B, the trailer lift system 206 includes engagement arms 208 that are configured to lift into engagement with support bars on an underside of a trailer (the freight vehicle 200 may include an additional corresponding engagement arm on the opposite face of the freight vehicle 200 than the face shown in FIGS. 2A and 2B). The trailer lift system 206 may accordingly include an appropriate lift or actuation components to enable the engagement arms 208 to reach and lift the support bars of the underside of the trailer and to enable the freight vehicle 200 to at least partially support the weight of the trailer.

Figure 3:
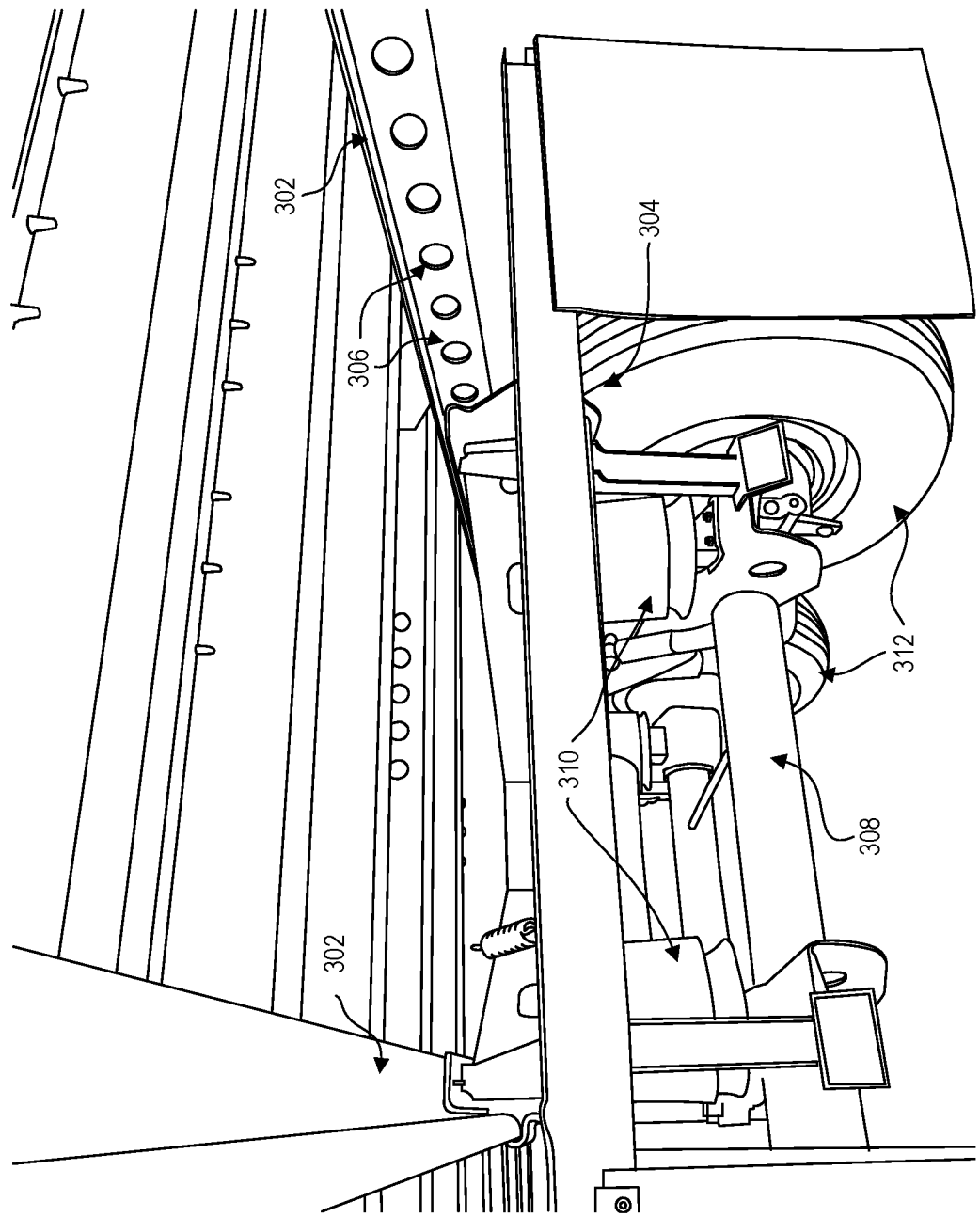
FIG. 3 illustrates a photograph of an example underside of an example semitrailer.

For illustrative purposes, FIG. 3 includes a photograph of an example underside of a semitrailer. FIG. 3 indicates example support bars 302 of the underside of the semitrailer with which the engagement arms 208 of the trailer lift system 206 may lift into engagement. In some implementations, the support bars 302 of the trailer (which the trailer lift system 206 of the freight vehicle 200 is configured to engage with) take the form of guide bars along which one or more rear axles (e.g., tandem axles) of the trailer are configured to slide to facilitate rear axle adjustment (e.g., to modify weight distribution between the kingpin of the trailer and the rear axles of the trailer). For instance, FIG. 3 shows a rear axle carriage 304 that supports rear tandem axles of the trailer. The rear axle carriage 304 is connected to and configured to slide along the support bars 302 (i.e., guide bars) of the trailer and lock into place via insertion of locking pins into locking pin holes 306 of the support bars 302.

In some implementations, the engagement arms 208 of the trailer lift system 206 of the freight vehicle 200 include locking pins similar to the locking pins of a rear axle carriage 304 of a trailer for engaging with locking pin holes 306 of support bars 302 (e.g., sliding tandem guide bar) of the trailer. For instance, FIGS. 2A and 2B illustrate locking pins 210 of the engagement arms 208 of the trailer lift system 206 of the freight vehicle 200. The locking pins 210 may be actuatable (in some instances autonomously) to allow the locking pins 210 to extend into engagement with and retract from engagement with locking pin holes (e.g., locking pin holes 306) of support bars (e.g., support bars 302 in the form of sliding tandem guide bars) on the underside of a trailer. The locking pins 210 may assist in achieving a secure connection between the freight vehicle 200 and the rear portion of the trailer to enable secure lifting of the rear portion of the trailer by the freight vehicle.

In some implementations, to enable a freight vehicle 200 to position itself below a rear portion of a trailer to lift the rear portion of the trailer via the trailer lift system 206, individuals (e.g., semitruck drivers) delivering a trailer for pickup and transportation by a freight vehicle system as presently disclosed may be requested to slide and lock the rear axle carriage of the semitrailer in a forward (or forwardmost) position to provide space between the rear axle carriage and the rear of the semitrailer for entry of the freight vehicle 200 below the semitrailer.

A trailer lift system 206 may include additional or alternative components for facilitating secure lifting of at least a portion of a trailer. For example, FIGS. 2A and 2B illustrate the trailer lift system 206 as including one or more clamps 212 for clamping onto support bars 302 of an underside of a trailer.

FIGS. 2A and 2B also illustrate that a freight vehicle 200 may include an axle securing system 214 (which may, in some instances, be regarded as a trailer lift system or a part thereof). The axle securing system 214 is configured to secure one or more rear axles of a trailer when lifting the trailer. Referring briefly to FIG. 3, a rear axle assembly 308 of a semitrailer may include a rear axle suspension system 310, which may cause the rear wheels 312 of the semitrailer to lower during lifting of the semitrailer via the trailer lift system 206 of the freight vehicle 200. To prevent the rear wheels 312 of the semitrailer from reaching the roadway (or the railway) when the semitrailer is lifted, the axle securing system 214 of the freight vehicle 200 may operate to counteract the rear axle suspension system(s) 310 of the semitrailer.

Figure 4A:
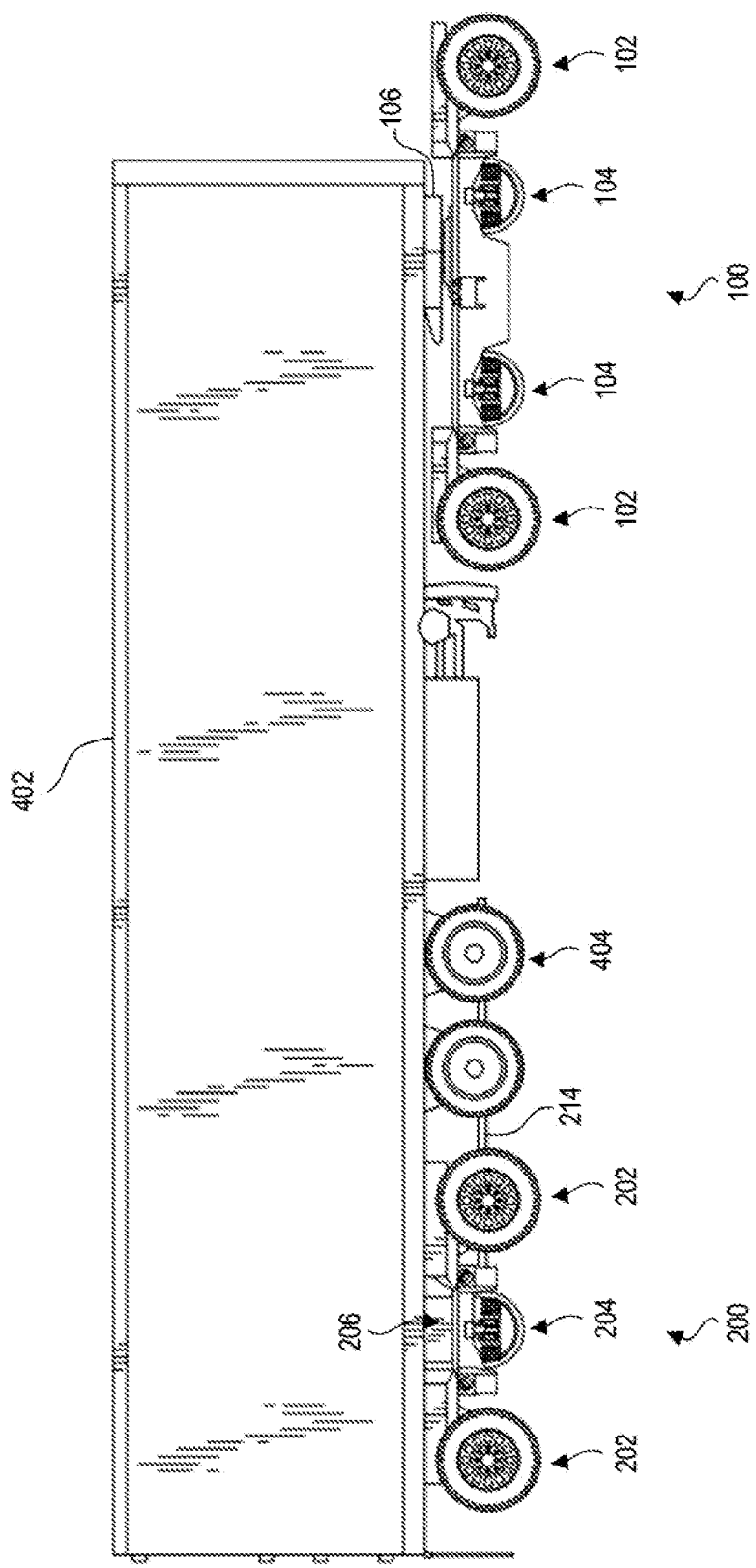
FIGS. 4A and 4B illustrate an example of a system including multiple freight vehicles connected to a trailer, with the freight vehicles configured in different operational modes.
Figure 4B:
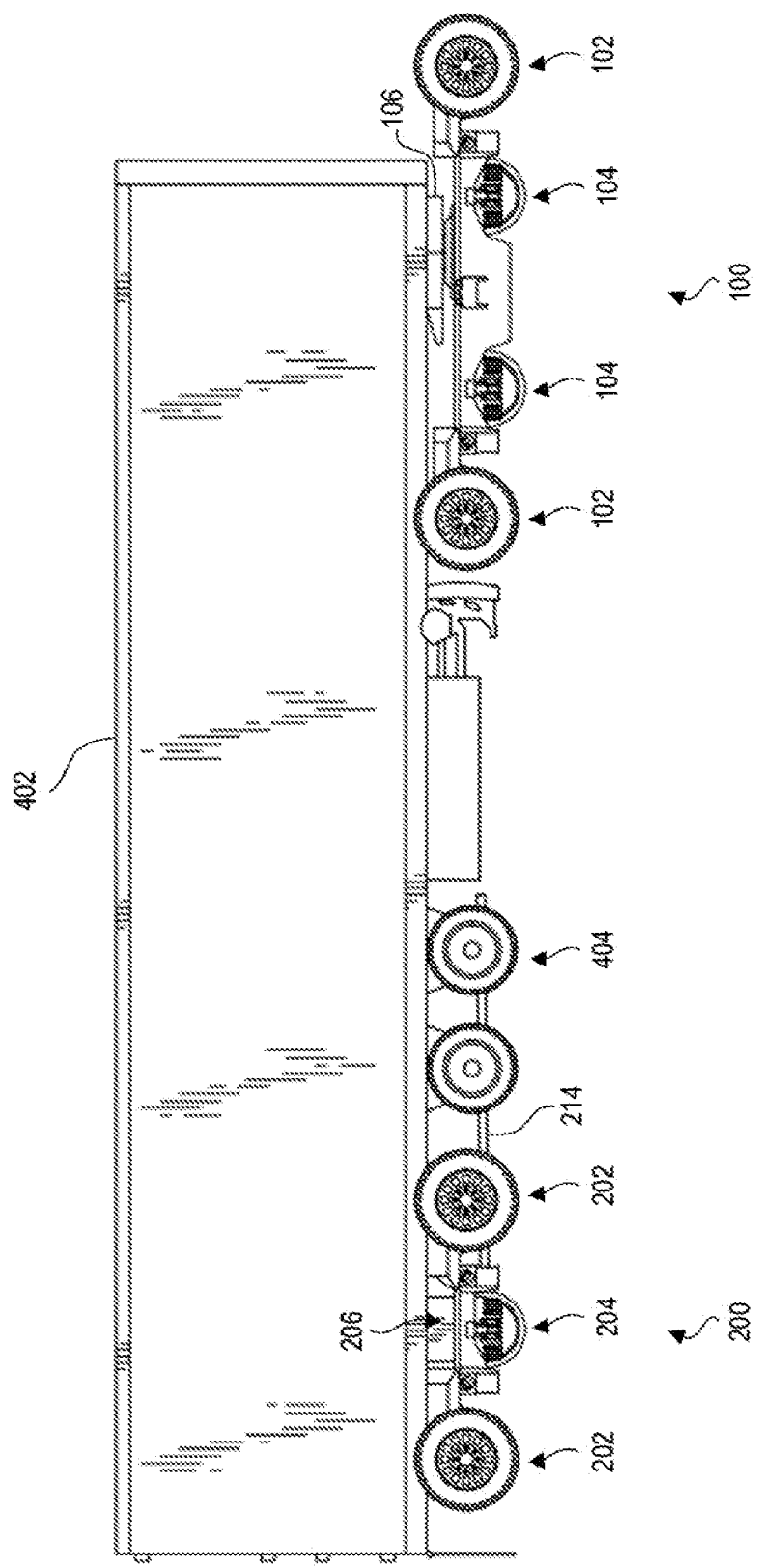

With attention again directed to FIGS. 2A and 2B, the axle securing system 214 may counteract the rear axle suspension of a trailer by implementing an axle securing arm (shown in FIGS. 2A and 2B with indeterminant length via break lines) to apply an upward force on the rear axle assembly (e.g., rear axle assembly 308) of the semitrailer (see, briefly, FIGS. 4A and 4B). In some implementations, the axle securing arm of the axle securing system 214 engages with the rear wheels of the trailer (rear wheels 312) to apply the upward force, such as by positioning a pair of arm components about lower portions of each rear wheel and applying an upward force via the pairs of arm components to each rear wheel (e.g., similar to under-lift towing arms). In another implementation, the axle securing arm of the axle securing system engages with rear wheels by insertion of arm components into the wheel hub of each rear wheel and applying an upward force via the arm components to each rear wheel.

In some implementations, a freight vehicle 200 relies on an axle securing system 214 to facilitate lifting of a rear portion of a trailer (in some instances, a freight vehicle 200 may omit or refrain from using engagement arms 208). In this way, an axle securing system 214 may, in some instances, fulfill the function of a trailer lift system 206 (e.g., in instances where a trailer omits sliding rear tandems, thereby precluding entry of the freight vehicle 200 below the trailer).

Like freight vehicle 100, a freight vehicle 200 may comprise or be in communication with image sensors (e.g., visible light, infrared image sensors, and/or others), depth detection systems (e.g., time-of-flight systems, stereoscopic depth detection systems, LIDAR systems, and/or others), interoceptive sensors (e.g., inertial measurement units (IMUs), magnetometers, accelerometers, gyroscopes, etc.), ultrasonic sensors, navigation systems (e.g., radio-based positioning systems, such as GPS systems), artificial intelligence module(s) (e.g., decision modules, computer vision modules such as object/feature detection modules, simultaneous localization and mapping (SLAM) modules, etc.), and/or other components for facilitating autonomous lifting of a trailer and/or autonomous locomotion.

Although the present disclosure focuses, in at least some respects, on examples in which freight vehicle 100 and freight vehicle 200 include at least partially different components, in some implementations, a freight vehicle 100 may include components of a freight vehicle 200 (e.g., a trailer lift system 206, an axle securing system 214) and/or a freight vehicle 200 may include components of a freight vehicle 100 (e.g., a fifth wheel connection system 106).

In some implementations, a freight vehicle 100 and a freight vehicle 200 operate in coordination with one another to lift a single trailer (e.g., a single semitrailer). FIGS. 4A and 4B illustrate a freight vehicle 100 and a freight vehicle 200 operating as a freight system to transport a particular semitrailer 402. FIG. 4A illustrates freight vehicle 100 (which may be regarded as a "first freight vehicle") operating in its road traversal mode with its set of road wheels 102 descended relative to its set of rail wheels 104. FIG. 4A also illustrates the fifth wheel connection system 106 of the freight vehicle 100 connected to the kingpin of the semitrailer 402.

FIG. 4A furthermore illustrates freight vehicle 200 (which may be regarded as a "second freight vehicle") operating in its road traversal mode with it set of road wheels 202 descended relative to its set of rail wheels 104. FIG. 4A shows the trailer lift system 206 of the freight vehicle 200 lifting an underside of the semitrailer 402. FIG. 4A furthermore illustrates the axle securing system 214 of the freight vehicle 200 securing the rear axle assembly 404 of the semitrailer 402 to prevent the rear wheels of the semitrailer from reaching the ground during transportation of the semitrailer 402 by the freight vehicles 100 and 200. In the configuration shown in FIG. 4A, the weight of the semitrailer is completely supported by the freight vehicles 100 and 200. The configuration of FIG. 4A may be achieved, for example, when the freight system (including freight vehicles 100 and 200) transports a semitrailer 402 from a pickup location (over a roadway) to a railway (e.g., for transit between rail-adjacent freight stations), or when the freight system transports the semitrailer 402 from a railway to a drop-off location (over a roadway).

FIG. 4B illustrates the freight vehicles 100 and 200 after connecting to and lifting the semitrailer 402 and after transitioning from the road traversal mode to the rail traversal mode, with the rail wheels 104 and 204 of the freight vehicles 100 and 200 descended relative to the road wheels 102 and 202 of the freight vehicles 100 and 200, respectively. The configuration shown in FIG. 4B may be achieved when the freight system (including freight vehicles 100 and 200) transports the semitrailer 402 over railway.

As noted above, a freight system may include at least two freight vehicles (e.g., a first freight vehicle corresponding to freight vehicle 100 and a freight vehicle 200 (and/or multiple sets of freight vehicles) and may perform various acts to facilitate transportation of trailers. A freight system may include one or more sensors, processors, and/or hardware storage devices that store instructions that are executable by the processor(s) to facilitate the performance of the various acts (at least some of which may rely at least in part on sensor data obtained via the sensor(s)). In some instances, at least some of the components (e.g., the processor(s), the sensor(s), and/or the hardware storage devices) are positioned on one or more of the freight vehicles of the freight system and/or on one or more remote devices (e.g., servers, control centers, etc.).

The following discussion now refers to a number of methods and method acts that may be performed in accordance with the present disclosure (e.g., utilizing a freight system as described herein and/or one or more components thereof). Although the method acts are shown and/or discussed in a certain order, no particular ordering is required unless specifically stated, or required because an act is dependent on another act being completed prior to the act being performed. Certain embodiments of the present disclosure may omit one or more of the acts described herein.

A method for controlling a freight system (which includes a first freight vehicle 100 and a second freight vehicle 200 as described herein) may include causing the first freight vehicle and the second freight vehicle to autonomously travel toward a particular trailer, the particular trailer being positioned at a first location. Such an act may be performed, for example, responsive to or based upon a request for autonomous transportation of the particular trailer from the first location to a second location (in particular where a railway intervenes between the first and second locations). The first and second freight vehicles may utilize the road traversal mode and/or rail traversal mode as needed to travel toward the particular trailer.

A method for controlling a freight system may additionally or alternatively include causing the first freight vehicle, while operating in the road traversal mode, to autonomously align with the particular trailer and to autonomously connect to a kingpin of the particular trailer via the fifth wheel connection system of the first freight vehicle.

A method for controlling a freight system may additionally or alternatively include causing the second freight vehicle, while operating in the road traversal mode, to autonomously align with the particular trailer and to autonomously lift a portion of the particular trailer that is separate from the kingpin of the particular trailer via the trailer lift system of the second freight vehicle, such that an entire weight of the particular trailer is supported by the first freight vehicle and the second freight vehicle. Such an act may additionally or alternatively include securing one or more rear axles of the particular trailer via an axle securing system of the second freight vehicle.

A method for controlling a freight system may additionally or alternatively include causing coordinated movement of the first freight vehicle and the second freight vehicle, while both the first freight vehicle and the second freight vehicle are operating in the road traversal mode, to autonomously transport the particular trailer over a roadway and into alignment with a railway.

A method for controlling a freight system may additionally or alternatively include causing (coordinated) transitioning of the first freight vehicle and the second freight vehicle from the road traversal mode into the rail traversal mode, such that the first set of road wheels of the first freight vehicle and the second set of road wheels of the second freight vehicle disengage from the roadway, and such that the first set of rail wheels of the first freight vehicle and the second set of rail wheels of the second freight vehicle engage with the railway.

A method for controlling a freight system may additionally or alternatively include causing coordinated movement of the first freight vehicle and the second freight vehicle, while both the first freight vehicle and the second freight vehicle are operating in the rail traversal mode, to autonomously transport the particular trailer over the railway and into alignment with a second roadway (e.g., near the second location).

A method for controlling a freight system may additionally or alternatively include causing (coordinated) transitioning of the first freight vehicle and the second freight vehicle from the rail traversal mode into the road traversal mode, such that the first set of road wheels of the first freight vehicle and the second set of road wheels of the second freight vehicle engage with the second roadway, and such that the first set of rail wheels of the first freight vehicle and the second set of rail wheels of the second freight vehicle disengage from the railway.

A method for controlling a freight system may additionally or alternatively include causing coordinated movement of the first freight vehicle and the second freight vehicle, while both the first freight vehicle and the second freight vehicle are operating in the road traversal mode, to autonomously transport the particular trailer over the second roadway and toward a second location.

A method for controlling a freight system may additionally or alternatively include causing the second freight vehicle, while operating in the road traversal mode, to autonomously lower the portion of the particular trailer that is separate from the kingpin of the particular trailer via the trailer lift system of the second freight vehicle, such that one or more rear wheels of the particular trailer engage with the second roadway. Such an act may additionally or alternatively include un-securing one or more rear axles of the particular trailer via the axle securing system of the second freight vehicle.

A method for controlling a freight system may additionally or alternatively include causing the first freight vehicle, while operating in the road traversal mode, to autonomously disconnect the fifth wheel connection system of the first freight vehicle from the kingpin of the particular trailer.

One or more of the foregoing acts may be performed via a freight system to facilitate transportation of particular trailers between different locations (where both railway and roadway intervene between the locations for traversal by freight vehicles of the freight system).

Figure 5:
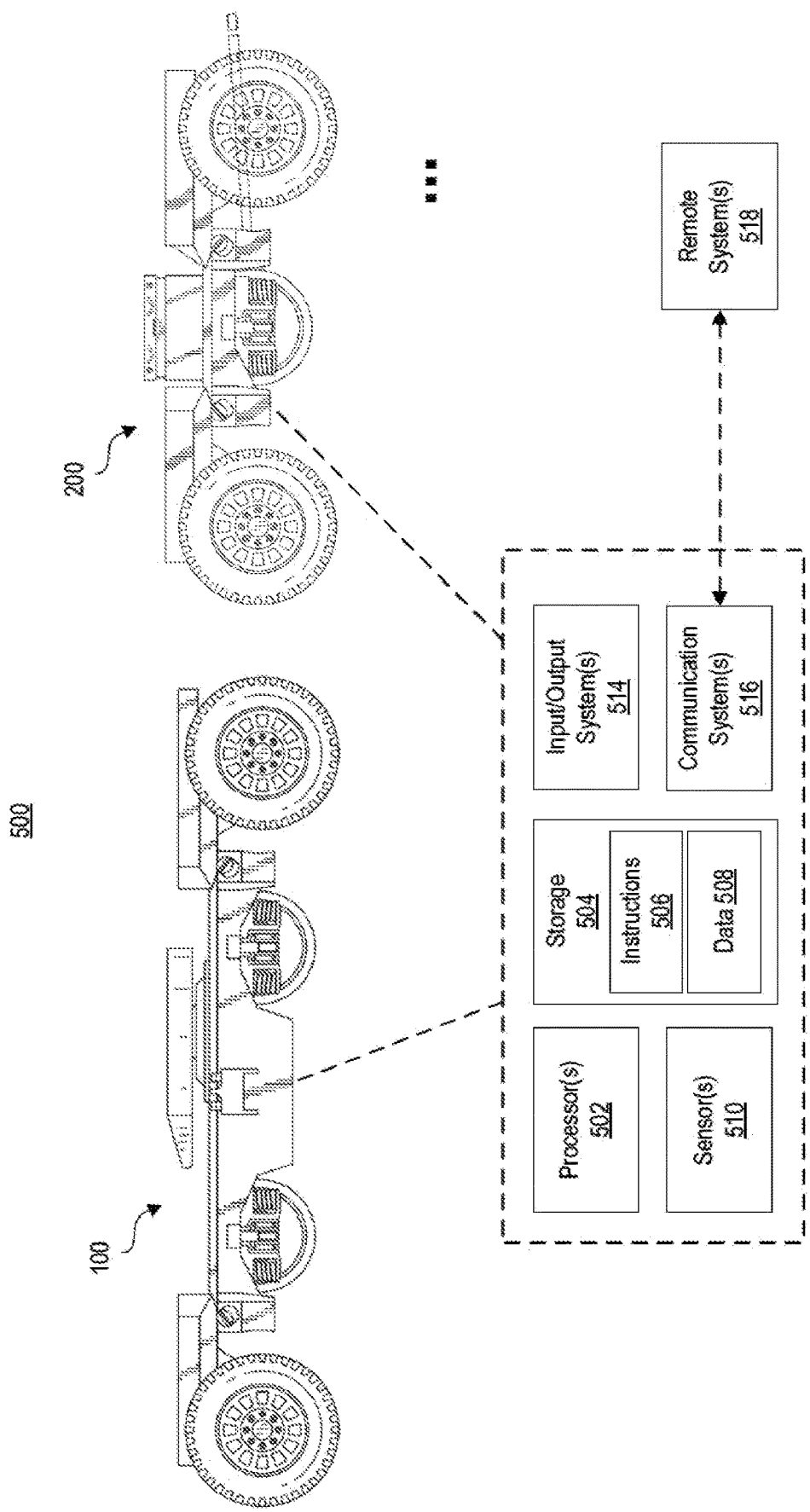
FIG. 5 illustrates example components of an example freight system.

FIG. 5 illustrates various example components of an example freight system 500 that may comprise or implement one or more disclosed embodiments. For example, FIG. 5 illustrates that a freight system 500 may include a freight vehicle 100, a freight vehicle 200, additional freight vehicles (as indicated by the ellipsis), processor(s) 502, storage 504, sensor(s) 510, input/output system(s) 514 (I/O system(s) 514), communication system(s) 516, and/or other components (e.g., battery and/or other power supply components). Although FIG. 5 illustrates a freight system 500 as including particular components, a freight system 500 may comprise any number of additional or alternative components. Furthermore, although some of the components may be illustrated or described as distinct entities, such distinctions are made for the sake of explanation/description only. For example, functionality described herein in association with a particular component may be performed by a different component or a combination of components as described herein. Accordingly, aspects of the components described herein may be combined with other components or divided into multiple components in accordance with the present disclosure. At least some of the components of FIG. 5 may be distributed among various devices. For example, remote system(s) 518, freight vehicle 100, and freight vehicle 200 may include respective processor(s) 502, storage 504, sensor(s) 510, I/O system(s) 514, communication system(s) 516, etc.

The processor(s) 502 may comprise one or more sets of electronic circuitries that include any number of logic units, registers, and/or control units to facilitate the execution of computer-readable instructions (e.g., instructions that form a computer program). Such computer-readable instructions may be stored within storage 504 (e.g., instructions 506). The storage 504 may comprise physical system memory and may be volatile, non-volatile, or some combination thereof. Furthermore, storage 504 may comprise local storage, remote storage (e.g., accessible via communication system(s) 516 or otherwise), or some combination thereof.

Additional details related to processors (e.g., processor(s) 502) and computer storage media (e.g., storage 504) will be provided hereinafter.

In some implementations, the processor(s) 502 may comprise or be configurable to execute any combination of software and/or hardware components that are operable to facilitate processing using machine learning models or other artificial intelligence-based structures/architectures. For example, processor(s) 502 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 502 may be configured to execute instructions 506 stored within storage 504 to perform certain actions associated with operation of the freight system 500. The actions may rely at least in part on data 508 stored on storage 504 in a volatile or non-volatile manner.

In some instances, the actions may rely at least in part on communication system(s) 516 for receiving data from other components and/or remote system(s) 518, which may include, for example, separate systems or computing devices, sensors, and/or others. The communications system(s) 516 may comprise any combination of software or hardware components that are operable to facilitate communication between on-system components/devices and/or with off-system components/devices. For example, the communications system(s) 516 may comprise ports, buses, or other physical connection apparatuses for communicating with other devices/components. Additionally, or alternatively, the communications system(s) 516 may comprise systems/components operable to communicate wirelessly with external systems and/or devices through any suitable communication channel(s), such as, by way of non-limiting example, Bluetooth, ultra-wideband, WLAN, infrared communication, radio-based communication, and/or others.

FIG. 5 illustrates that a freight system 500 may comprise or be in communication with sensor(s) 510 (e.g., to obtain data 508 used to perform acts described herein). Sensor(s) 510 may comprise any device for capturing or measuring data representative of perceivable or detectable phenomena. By way of non-limiting example, the sensor(s) 510 may comprise one or more image sensors, depth sensors, microphones, thermometers, barometers, magnetometers, accelerometers, gyroscopes, navigation systems, and/or others.

Furthermore, FIG. 5 illustrates that a freight system 500 may comprise or be in communication with I/O system(s) 514. I/O system(s) 514 may include any type of input or output device such as, by way of non-limiting example, a display, a touch screen, a mouse, a keyboard, a controller, a speaker, and/or others, without limitation.

Embodiments of the present disclosure may comprise or utilize a special-purpose or general-purpose computer system, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media and may comprise physical computer storage media or hardware storage devices. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be included within or accessed and executed by a controller, a general-purpose, or a special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" may be defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions may comprise, for example, instructions and data which, when executed by one or more processors, cause a general-purpose computer system, special-purpose computer system, or special-purpose processing device to perform a certain function or group of functions. Computer-executable instructions may be, for example, binaries, intermediate format instructions such as assembly language, or even source code.

The disclosure of the present application may be practiced in network computing environments with many types of computer system configurations, including, but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The disclosure of the present application may also be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Certain terms are used throughout the description and claims to refer to particular methods, features, or components. As those having ordinary skill in the art will appreciate, different persons may refer to the same methods, features, or components by different names. This disclosure does not intend to distinguish between methods, features, or components that differ in name but not function. The figures are not necessarily drawn to scale. Certain features and components herein may be shown in exaggerated scale or in somewhat schematic form and some details of conventional elements may not be shown or described in interest of clarity and conciseness.

Certain embodiments and features may have been described using a set of numerical upper limits and a set of numerical lower limits. Ranges including the combination of any two values, e.g., the combination of any lower value with any upper value, the combination of any two lower values, and/or the combination of any two upper values are contemplated unless otherwise indicated. Certain lower limits, upper limits and ranges may appear in one or more claims below. Any numerical value is "about" or "approximately" the indicated value, and takes into account experimental error and variations that would be expected by a person having ordinary skill in the art.

This disclosure provides various examples, embodiments, and features which, unless expressly stated or which would be mutually exclusive, should be understood to be combinable with other examples, embodiments, or features described herein.

In addition to the above, further embodiments and examples include the following:

1. One or more freight vehicles and/or one or more systems and/or methods for implementing one or more freight vehicles, as shown and/or described herein.

2. A freight vehicle, comprising: a set of road wheels configured for road traversal; a road motor system configured to drive the set of road wheels to facilitate road traversal; a set of rail wheels configured for rail traversal, the set of rail wheels being separate from the set of road wheels; a rail motor system, the rail motor system being separate from the road motor system, the rail motor system being configured to drive the set of rail wheels to facilitate rail traversal; and an actuation system configured to modify a relative positioning of the set of road wheels and the set of rail wheels to facilitate operation of the freight vehicle according to a plurality of operational modes, the plurality of operational modes comprising: a road traversal mode wherein the actuation system causes the set of road wheels to contact a road and causes the set of rail wheels to refrain from contacting the road, and wherein the road motor system drives the set of road wheels to facilitate traversal of the road; and a rail traversal mode wherein the actuation system causes the set of rail wheels to contact a rail and causes the set of road wheels to refrain from contacting the rail, and wherein the rail motor system drives the set of rail wheels to facilitate traversal of the rail.

3. The freight vehicle of 2, wherein the road motor system comprises a respective in-wheel motor for at least some road wheels of the set of road wheels.

4. The freight vehicle of any or a combination of 2-3 above and/or 5-15 below, wherein the rail motor system comprises a respective in-wheel motor for at least some rail wheels of the set of rail wheels.

5. The freight vehicle of any or a combination of 2-4 above and/or 6-15 below, wherein each road wheel of the set of road wheels comprises a respective independent suspension, and wherein the actuation system actuates the respective independent suspension of each road wheel of the set of road wheels to facilitate selective switching between the road traversal mode and the rail traversal mode.

6. The freight vehicle of any or a combination of 2-4 above and/or 7-15 below, wherein each road wheel of the set of road wheels comprises a respective air suspension system, and wherein the actuation system controls the respective air or hydraulic suspension system of each road wheel of the set of road wheels to facilitate selective switching between the road traversal mode and the rail traversal mode.

7. The freight vehicle of any or a combination of 2-6 above and/or 8-15 below, wherein the actuation system displaces the set of rail wheels to facilitate selective switching between the road traversal mode and the rail traversal mode.

8. The freight vehicle of any or a combination of 2-7 above and/or 9-15 below, further comprising a fifth wheel connection system configured to receive a kingpin of a trailer, wherein the freight vehicle is configured to operate in the road traversal mode and the rail traversal mode while connected to the trailer via the fifth wheel connection system.

9. The freight vehicle of any or a combination of 2-8 above and/or 10-15 below, further comprising a trailer lift system configured to lift a portion of a trailer that is separate from a kingpin of the trailer, wherein the freight vehicle is configured to operate in the road traversal mode and the rail traversal mode while lifting the trailer via the trailer lift system.

10. The freight vehicle of 9, wherein the trailer lift system comprises one or more engagement arms configured to lift into engagement with one or more support bars on an underside of the trailer.

11. The freight vehicle of 10, wherein the one or more support bars comprise one or more guide bars on the underside of the trailer along which one or more rear axles of the trailer are configured to slide to facilitate rear axle adjustment.

12. The freight vehicle of 11, wherein the one or more engagement arms of the trailer lift system comprise one or more locking pins configured to extend into engagement with one or more locking pin holes of the one or more guide bars on the underside of the trailer.

13. The freight vehicle of any or a combination of 9-12 above and/or 14-15 below, wherein the trailer lift system comprises an axle securing system configured to secure one or more rear axles of the trailer when lifting the trailer.

14. The freight vehicle of 13, wherein the axle securing system comprises one or more axle securing arms configured to apply upward force to the one or more rear axles of the trailer or to one or more rear wheels of the trailer to facilitate securement of the one or more rear axles of the trailer when lifting the trailer.

15. The freight vehicle of any or a combination of 2-14 above, further comprising: one or more processors; and one or more hardware storage devices storing instructions that are executable by the one or more processors to configure the freight vehicle to:

autonomously connect to or lift a portion of a trailer while in the road traversal mode; autonomously switch between the road traversal mode and the rail traversal mode while connected to or lifting the trailer to autonomously transport the trailer over at least a roadway and a railway; and/or autonomously disconnect from or lower the portion of the trailer while in the road traversal mode.

16. A first freight vehicle, comprising: a first set of road wheels configured for road traversal; a first road motor system configured to drive the first set of road wheels to facilitate road traversal; a first set of rail wheels configured for rail traversal, the first set of rail wheels being separate from the first set of road wheels; a first rail motor system configured to drive the first set of rail wheels to facilitate rail traversal; a first actuation system configured to modify a relative positioning of the first set of road wheels and the first set of rail wheels to facilitate selective switching between a road traversal mode and a rail traversal mode; and a fifth wheel connection system configured to receive a kingpin of a trailer, wherein the first freight vehicle is configured to operate in the road traversal mode and the rail traversal mode while connected to the trailer via the fifth wheel connection system.

17. The first freight vehicle of 16, wherein the first road motor system comprises a respective in-wheel motor for at least some road wheels of the first set of road wheels.

18. The first freight vehicle of any or a combination of 16-17 above and/or 19-21 below, wherein the first rail motor system comprises a respective in-wheel motor for at least some rail wheels of the first set of rail wheels.

19. The first freight vehicle of any or a combination of 16-18 above and/or 20-21 below, wherein each road wheel of the first set of road wheels comprises a respective independent suspension, and wherein the first actuation system actuates the respective independent suspension of each road wheel of the first set of road wheels to facilitate selective switching between the road traversal mode and the rail traversal mode.

20. The first freight vehicle of any or a combination of 16-18 above and/or 21 below, wherein each road wheel of the first set of road wheels comprises a respective air or hydraulic suspension system, and wherein the first actuation system controls the respective air or hydraulic suspension system of each road wheel of the first set of road wheels to facilitate selective switching between the road traversal mode and the rail traversal mode.

21. The first freight vehicle of any or a combination of 16-20 above, wherein the first actuation system displaces the first set of rail wheels to facilitate selective switching between the road traversal mode and the rail traversal mode.

22. A second freight vehicle, comprising: a second set of road wheels configured for road traversal; a second road motor system configured to drive the second set of road wheels to facilitate road traversal; a second set of rail wheels configured for rail traversal, the second set of rail wheels being separate from the second set of road wheels; a second rail motor system configured to drive the second set of rail wheels to facilitate rail traversal; a second actuation system configured to modify a relative positioning of the second set of road wheels and the second set of rail wheels to facilitate selective switching between a road traversal mode and a rail traversal mode; and a trailer lift system configured to lift a portion of a trailer that is separate from a kingpin of the trailer, wherein the second freight vehicle is configured to operate in the road traversal mode and the rail traversal mode while lifting the trailer via the trailer lift system.

23. The second freight vehicle of 22, wherein the second road motor system comprises a respective in-wheel motor for at least some road wheels of the second set of road wheels.

24. The second freight vehicle of any or a combination of 22-23 above and/or 25-32 below, wherein the second rail motor system comprises a respective in-wheel motor for at least some rail wheels of the second set of rail wheels.

25. The second freight vehicle of any or a combination of 22-24 above and/or 26-32 below, wherein each road wheel of the second set of road wheels comprises a respective independent suspension, and wherein the second actuation system actuates the respective independent suspension of each road wheel of the second set of road wheels to facilitate selective switching between the road traversal mode and the rail traversal mode.

26. The second freight vehicle of any or a combination of 22-24 above and/or 27-32 below, wherein each road wheel of the second set of road wheels comprises a respective air or hydraulic suspension system, and wherein the second actuation system controls the respective air or hydraulic suspension system of each road wheel of the second set of road wheels to facilitate selective switching between the road traversal mode and the rail traversal mode.

27. The second freight vehicle of any or a combination of 22-26 above and/or 28-32 below, wherein the second actuation system displaces the second set of rail wheels to facilitate selective switching between the road traversal mode and the rail traversal mode.

28. The second freight vehicle of any or a combination of 22-27 above and/or 29-32 below, wherein the trailer lift system comprises one or more engagement arms configured to lift into engagement with one or more support bars on an underside of the trailer.

29. The second freight vehicle of 28, wherein the one or more support bars comprise one or more guide bars on the underside of the trailer along which one or more rear axles of the trailer are configured to slide to facilitate rear axle adjustment.

30. The second freight vehicle of 29, wherein the one or more engagement arms of the trailer lift system comprise one or more locking pins configured to extend into engagement with one or more locking pin holes of the one or more guide bars on the underside of the trailer.

31. The second freight vehicle of any or a combination of 22-30 above and/or 31-32 below, wherein the trailer lift system comprises an axle securing system configured to secure one or more rear axles of the trailer when lifting the trailer.

32. The second freight vehicle of 31, wherein the axle securing system comprises one or more axle securing arms configured to apply upward force to the one or more rear axles of the trailer or to one or more rear wheels of the trailer to facilitate securement of the one or more rear axles of the trailer when lifting the trailer.

33. A freight system, comprising: a first freight vehicle according to any or a combination of 16-21; a second freight vehicle according to any or a combination of 22-32; one or more processors; and one or more hardware storage devices storing instructions that are executable by the one or more processors to configure the freight system to perform one or more acts.

34. The freight system of 33, wherein the instructions are executable by the one or more processors to configure the freight system to: cause the first freight vehicle and the second freight vehicle to autonomously travel toward a particular trailer, the particular trailer being positioned at a first location; cause the first freight vehicle, while operating in the road traversal mode, to autonomously align with the particular trailer and to autonomously connect to a kingpin of the particular trailer via the fifth wheel connection system of the first freight vehicle; and cause the second freight vehicle, while operating in the road traversal mode, to autonomously align with the particular trailer and to autonomously lift a portion of the particular trailer that is separate from the kingpin of the particular trailer via the trailer lift system of the second freight vehicle, such that an entire weight of the particular trailer is supported by the first freight vehicle and the second freight vehicle.

35. The freight system of 34, wherein the instructions are executable by the one or more processors to configure the freight system to: cause coordinated movement of the first freight vehicle and the second freight vehicle, while both the first freight vehicle and the second freight vehicle are operating in the road traversal mode, to autonomously transport the particular trailer over a roadway and into alignment with a railway; and cause transitioning of the first freight vehicle and the second freight vehicle from the road traversal mode into the rail traversal mode, such that the first set of road wheels of the first freight vehicle and the second set of road wheels of the second freight vehicle disengage from the roadway, and such that the first set of rail wheels of the first freight vehicle and the second set of rail wheels of the second freight vehicle engage with the railway.

36. The freight system of 35, wherein the instructions are executable by the one or more processors to configure the freight system to: cause coordinated movement of the first freight vehicle and the second freight vehicle, while both the first freight vehicle and the second freight vehicle are operating in the rail traversal mode, to autonomously transport the particular trailer over the railway and into alignment with a second roadway; and cause transitioning of the first freight vehicle and the second freight vehicle from the rail traversal mode into the road traversal mode, such that the first set of road wheels of the first freight vehicle and the second set of road wheels of the second freight vehicle engage with the second roadway, and such that the first set of rail wheels of the first freight vehicle and the second set of rail wheels of the second freight vehicle disengage from the railway.

37. The freight system of any or a combination of 35-36 above, wherein the instructions are executable by the one or more processors to configure the freight system to: cause coordinated movement of the first freight vehicle and the second freight vehicle, while both the first freight vehicle and the second freight vehicle are operating in the road traversal mode, to autonomously transport the particular trailer over the second roadway and toward a second location; cause the second freight vehicle, while operating in the road traversal mode, to autonomously lower the portion of the particular trailer that is separate from the kingpin of the particular trailer via the trailer lift system of the second freight vehicle, such that one or more rear wheels of the particular trailer engage with the second roadway; and cause the first freight vehicle, while operating in the road traversal mode, to autonomously disconnect the fifth wheel connection system of the first freight vehicle from the kingpin of the particular trailer.

38. One or more hardware storage devices storing instructions that are executable by one or more processors of a freight system to configure the freight system to perform one or more acts, the freight system comprising: a first freight vehicle according to any or a combination of 16-21; and a second freight vehicle according to any or a combination of 22-32.

39. The one or more hardware storage devices of 38, wherein the instructions are executable by the one or more processors to configure the freight system to: cause the first freight vehicle and the second freight vehicle to autonomously travel toward a particular trailer, the particular trailer being positioned at a first location; cause the second freight vehicle to autonomously travel toward the particular trailer; cause the first freight vehicle, while operating in the road traversal mode, to autonomously align with the particular trailer and to autonomously connect to a kingpin of the particular trailer via the fifth wheel connection system of the first freight vehicle; and cause the second freight vehicle, while operating in the road traversal mode, to autonomously align with the particular trailer and to autonomously lift a portion of the particular trailer that is separate from the kingpin of the particular trailer via the trailer lift system of the second freight vehicle, such that an entire weight of the particular trailer is supported by the first freight vehicle and the second freight vehicle.

40. The one or more hardware storage devices of 39, wherein the instructions are executable by the one or more processors to configure the freight system to: cause coordinated movement of the first freight vehicle and the second freight vehicle, while both the first freight vehicle and the second freight vehicle are operating in the road traversal mode, to autonomously transport the particular trailer over a roadway and into alignment with a railway; and cause transitioning of the first freight vehicle and the second freight vehicle from the road traversal mode into the rail traversal mode, such that the first set of road wheels of the first freight vehicle and the second set of road wheels of the second freight vehicle disengage from the roadway, and such that the first set of rail wheels of the first freight vehicle and the second set of rail wheels of the second freight vehicle engage with the railway.

41. The one or more hardware storage devices of 40, wherein the instructions are executable by the one or more processors to configure the freight system to: cause coordinated movement of the first freight vehicle and the second freight vehicle, while both the first freight vehicle and the second freight vehicle are operating in the rail traversal mode, to autonomously transport the particular trailer over the railway and into alignment with a second roadway; and cause transitioning of the first freight vehicle and the second freight vehicle from the rail traversal mode into the road traversal mode, such that the first set of road wheels of the first freight vehicle and the second set of road wheels of the second freight vehicle engage with the second roadway, and such that the first set of rail wheels of the first freight vehicle and the second set of rail wheels of the second freight vehicle disengage from the railway.

42. The one or more hardware storage devices of any or a combination of 40-41 above, wherein the instructions are executable by the one or more processors to configure the freight system to: cause coordinated movement of the first freight vehicle and the second freight vehicle, while both the first freight vehicle and the second freight vehicle are operating in the road traversal mode, to autonomously transport the particular trailer over the second roadway and toward a second location; cause the second freight vehicle, while operating in the road traversal mode, to autonomously lower the portion of the particular trailer that is separate from the kingpin of the particular trailer via the trailer lift system of the second freight vehicle, such that one or more rear wheels of the particular trailer engage with the second roadway; and cause the first freight vehicle, while operating in the road traversal mode, to autonomously disconnect the fifth wheel connection system of the first freight vehicle from the kingpin of the particular trailer.

43. A method for controlling a freight system, the method comprising: providing a freight system, the freight system comprising: a first freight vehicle according to any or a combination of 16-21; and a second freight vehicle according to any or a combination of 22-32.

44. The method of 43, further comprising: causing the first freight vehicle and the second freight vehicle to autonomously travel toward a particular trailer, the particular trailer being positioned at a first location; causing the second freight vehicle to autonomously travel toward the particular trailer; causing the first freight vehicle, while operating in the road traversal mode, to autonomously align with the particular trailer and to autonomously connect to a kingpin of the particular trailer via the fifth wheel connection system of the first freight vehicle; and causing the second freight vehicle, while operating in the road traversal mode, to autonomously align with the particular trailer and to autonomously lift a portion of the particular trailer that is separate from the kingpin of the particular trailer via the trailer lift system of the second freight vehicle, such that an entire weight of the particular trailer is supported by the first freight vehicle and the second freight vehicle.

45. The method of 44, further comprising: causing coordinated movement of the first freight vehicle and the second freight vehicle, while both the first freight vehicle and the second freight vehicle are operating in the road traversal mode, to autonomously transport the particular trailer over a roadway and into alignment with a railway; and causing transitioning of the first freight vehicle and the second freight vehicle from the road traversal mode into the rail traversal mode, such that the first set of road wheels of the first freight vehicle and the second set of road wheels of the second freight vehicle disengage from the roadway, and such that the first set of rail wheels of the first freight vehicle and the second set of rail wheels of the second freight vehicle engage with the railway.

46. The method of 45, further comprising: causing coordinated movement of the first freight vehicle and the second freight vehicle, while both the first freight vehicle and the second freight vehicle are operating in the rail traversal mode, to autonomously transport the particular trailer over the railway and into alignment with a second roadway; and causing transitioning of the first freight vehicle and the second freight vehicle from the rail traversal mode into the road traversal mode, such that the first set of road wheels of the first freight vehicle and the second set of road wheels of the second freight vehicle engage with the second roadway, and such that the first set of rail wheels of the first freight vehicle and the second set of rail wheels of the second freight vehicle disengage from the railway.

47. The method of any or a combination of 45-46 above, further comprising: causing coordinated movement of the first freight vehicle and the second freight vehicle, while both the first freight vehicle and the second freight vehicle are operating in the road traversal mode, to autonomously transport the particular trailer over the second roadway and toward a second location; causing the second freight vehicle, while operating in the road traversal mode, to autonomously lower the portion of the particular trailer that is separate from the kingpin of the particular trailer via the trailer lift system of the second freight vehicle, such that one or more rear wheels of the particular trailer engage with the second roadway; and causing the first freight vehicle, while operating in the road traversal mode, to autonomously disconnect the fifth wheel connection system of the first freight vehicle from the kingpin of the particular trailer.

48. A freight vehicle, comprising: a set of road wheels configured for road traversal; a set of rail wheels configured for rail traversal, the set of rail wheels being separate from the set of road wheels; and an actuation system configured to modify a relative positioning of the set of road wheels and the set of rail wheels to facilitate operation of the freight vehicle according to a plurality of operational modes, the plurality of operational modes comprising: a road traversal mode wherein the actuation system causes the set of road wheels to contact a road and causes the set of rail wheels to refrain from contacting the road, and wherein a motor system drives the set of road wheels to facilitate traversal of the road; and a rail traversal mode wherein the actuation system causes the set of rail wheels to contact a rail and causes the set of road wheels to refrain from contacting the rail, and wherein the motor system drives the set of rail wheels to facilitate traversal of the rail.

49. The freight vehicle according to any or a combination of 48 above and/or 50-64 below, wherein the motor system includes a road motor system configured to drive the set of road wheels to facilitate road traversal, and
wherein in the road traversal mode, the road motor system drives the set of road wheels to facilitate traversal of the road.

50. The freight vehicle according to any or a combination of 48-49 above and/or 51-64 below, wherein the motor system includes a rail motor system, the rail motor system being configured to drive the set of rail wheels to facilitate rail traversal, and wherein in the road traversal mode, the rail motor system drives the set of rail wheels to facilitate traversal of the rail.

51. The freight vehicle according to any or a combination of 48-50 above and/or 52-64 below, wherein the motor system includes a rail motor system, the rail motor system being separate from the road motor system, the rail motor system being configured to drive the set of rail wheels to facilitate rail traversal, and wherein in the road traversal mode, the rail motor system drives the set of rail wheels to facilitate traversal of the rail.

52. The freight vehicle according to any or a combination of 48-51 above and/or 53-64 below, wherein the road motor system comprises a respective in-wheel motor for at least one or more of the road wheels of the set of road wheels.

53. The freight vehicle according to any or a combination of 48-52 above and/or 54-64 below, wherein the rail motor system comprises a respective in-wheel motor for at least one or more of the rail wheels of the set of rail wheels.

54. The freight vehicle according to any or a combination of 48-53 above and/or 55-64 below, wherein each road wheel of the set of road wheels comprises a respective independent suspension, and wherein the actuation system actuates the respective independent suspension of each road wheel of the set of road wheels to facilitate selective switching between the road traversal mode and the rail traversal mode.

55. The freight vehicle according to any or a combination of 48-54 above and/or 54-64 below, wherein the actuation system displaces the set of rail wheels to facilitate selective switching between the road traversal mode and the rail traversal mode.

56. The freight vehicle according to any or a combination of 48-55 above and/or 57-64 below, further comprising a connection system configured to receive a kingpin of a trailer or connector provided toward a front end of the trailer, wherein the freight vehicle is configured to operate in the road traversal mode and the rail traversal mode while connected to the trailer via the connection system.

57. The freight vehicle according to any or a combination of 48-56 above and/or 57-64 below, wherein the connection system includes a fifth-wheel type connection system to receive a kingpin of a trailer 58. The freight vehicle according to any or a combination of 48-57 above and/or 59-64 below, further comprising a trailer lift system configured to lift at least a portion of a tail end of a trailer or a portion of the trailer that is opposite from an end of the trailer that has a kingpin of the trailer, wherein the freight vehicle is configured to operate in the road traversal mode and the rail traversal mode while lifting the trailer via the trailer lift system.

59. The freight vehicle according to any or a combination of 48-58 above and/or 60-64 below, wherein the trailer lift system comprises one or more engagement arms configured to lift into engagement with one or more support bars on an underside of the trailer.

60. The freight vehicle according to any or a combination of 48-59 above and/or 61-64 below, wherein the one or more support bars comprise one or more guide bars on the underside of the trailer along which one or more rear axles of the trailer are configured to slide to facilitate rear axle adjustment.

61. The freight vehicle according to any or a combination of 48-60 above and/or 62-64 below, wherein the one or more engagement arms of the trailer lift system comprise one or more locking pins configured to extend into engagement with one or more locking pin holes of the one or more guide bars on the underside of the trailer.

62. The freight vehicle according to any or a combination of 48-62 above and/or 63-64 below, wherein the trailer lift system comprises an axle securing system configured to secure one or more rear axles of the trailer when lifting the trailer.

63. The freight vehicle according to any or a combination of 48-62 above and/or 64 below, wherein the axle securing system comprises one or more axle securing arms configured to apply upward force to the one or more rear axles of the trailer or to one or more rear wheels of the trailer to facilitate securement of the one or more rear axles of the trailer when lifting the trailer.

64. The freight vehicle according to any or a combination of 48-63 above and/or 51-64 below, further comprising: one or more processors; and one or more hardware storage devices storing instructions that are executable by the one or more processors to configure the freight vehicle to: autonomously connect to or lift a portion of a trailer while in the road traversal mode; autonomously switch between the road traversal mode and the rail traversal mode while connected to or lifting the trailer to autonomously transport the trailer over at least a roadway and a railway; and/or autonomously disconnect from or lower the portion of the trailer while in the road traversal mode.

65. A freight system comprising: a plurality of freight vehicles according to 48-64 above, including a first freight vehicle and a second freight vehicle; a communication system configured to communicate with each of the plurality of freight vehicles; one or more processors; one or more hardware storage devices storing instructions that are executable by the one or more processors to configure the processor to control, through the communication system, one or more acts of one or more of the plurality of freight vehicles including attaching of the one or more freight vehicles to a trailer, and control movement of one or more of the plurality of freight vehicles.

66. The freight system according to claim 65 above, wherein the first freight vehicle comprises a connection system configured to receive a kingpin of a trailer or connector provided toward a front end of the trailer, wherein the freight vehicle is configured to operate in the road traversal mode and the rail traversal mode while connected to the trailer via the connection system, and wherein the second freight vehicle comprises a trailer lift system configured to lift at least a portion of a tail end of a trailer or a portion of the trailer that is opposite from an end of the trailer that has a kingpin of the trailer, wherein the freight vehicle is configured to operate in the road traversal mode and the rail traversal mode while lifting the trailer via the trailer lift system.

67. A method of moving freight including: providing the freight system according to claim 65 above; and controlling, through the communication system, one or more acts of one or more of the plurality of freight vehicles including attaching of the one or more freight vehicles to a trailer, and control movement of one or more of the plurality of freight vehicles.

68. A freight vehicle, comprising: a set of road wheels configured for road traversal; a set of rail wheels configured for rail traversal, the set of rail wheels being separate from the set of road wheels; and an actuation system configured to modify a relative positioning of the set of road wheels and the set of rail wheels to facilitate operation of the freight vehicle according to a plurality of operational modes, the plurality of operational modes comprising: a road traversal mode wherein the actuation system causes the set of road wheels to contact a road, while one or more rail wheels of the set of rail wheels are caused to not contact the road or alternatively do contact the road, and wherein a motor system drives the set of road wheels to facilitate traversal of the road; and a rail traversal mode wherein the actuation system causes the set of rail wheels to contact a rail, while one or more road wheels of the set of road wheels are caused to not contact the rail or alternatively do contact the rail, and wherein the motor system drives the set of rail wheels to facilitate traversal of the rail.

Although various example embodiments have been described in detail herein, many modifications are possible in the example embodiments without materially departing from the concepts of present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scopes of the disclosure and the appended claims. Each addition, deletion, and modification to the embodiments that falls within the meaning and scope of the claims is to be embraced by the claims.

The invention claimed is:

1. A freight vehicle, comprising:
   a set of road wheels configured for road traversal;
   a set of rail wheels configured for rail traversal, the set of rail wheels being separate from the set of road wheels;
   an actuation system configured to modify a relative positioning of the set of road wheels and the set of rail wheels to facilitate operation of the freight vehicle according to a plurality of operational modes, the plurality of operational modes comprising:
      a road traversal mode wherein the actuation system causes the set of road wheels to contact a road and causes the set of rail wheels to refrain from contacting the road, and wherein a motor system drives the set of road wheels to facilitate traversal of the road; and
      a rail traversal mode wherein the actuation system causes the set of rail wheels to contact a rail and causes the set of road wheels to refrain from contacting the rail, and wherein the motor system drives the set of rail wheels to facilitate traversal of the rail, and
   a trailer lift system configured to lift at least a portion of a tail end of a trailer or a portion of the trailer that is opposite from an end of the trailer that has a kingpin of the trailer, wherein the freight vehicle is configured to operate in the road traversal mode and the rail traversal mode while lifting the trailer via the trailer lift system, wherein the trailer lift system comprises one or more engagement arms configured to lift into engagement with one or more support bars on an underside of the trailer, and wherein the one or more engagement arms of the trailer lift system comprise one or more locking pins configured to extend into engagement with one or more locking pin holes of the one or more guide bars on the underside of the trailer.

2. The freight vehicle according to claim 1, wherein the motor system includes a road motor system configured to drive the set of road wheels to facilitate road traversal, and wherein in the road traversal mode, the road motor system drives the set of road wheels to facilitate traversal of the road.

3. The freight vehicle according to claim 2, wherein the motor system includes a rail motor system, the rail motor system being separate from the road motor system, the rail motor system being configured to drive the set of rail wheels to facilitate rail traversal, and wherein in the rail traversal mode, the rail motor system drives the set of rail wheels to facilitate traversal of the rail.

4. The freight vehicle according to claim 2, wherein the road motor system comprises a respective in-wheel motor for at least one or more of the road wheels of the set of road wheels.

5. The freight vehicle according to claim 1, wherein the motor system includes a rail motor system, the rail motor system being configured to drive the set of rail wheels to facilitate rail traversal, and wherein in the rail traversal mode, the rail motor system drives the set of rail wheels to facilitate traversal of the rail.

6. The freight vehicle according to claim 5, wherein the rail motor system comprises a respective in-wheel motor for at least one or more of the rail wheels of the set of rail wheels.

7. The freight vehicle according to claim 1, wherein each road wheel of the set of road wheels comprises a respective independent suspension, and wherein the actuation system actuates the respective independent suspension of each road wheel of the set of road wheels to facilitate selective switching between the road traversal mode and the rail traversal mode.

8. The freight vehicle according to claim 1, wherein the actuation system displaces the set of rail wheels to facilitate selective switching between the road traversal mode and the rail traversal mode.

9. The freight vehicle according to claim 1, further comprising a connection system configured to receive a kingpin of a trailer or connector provided toward a front end of the trailer, wherein the freight vehicle is configured to operate in the road traversal mode and the rail traversal mode while connected to the trailer via the connection system.

10. The freight vehicle according to claim 9, wherein the connection system includes a fifth-wheel connection system to receive a kingpin of a trailer.

11. The freight vehicle according to claim 1, wherein the one or more support bars comprise one or more guide bars on the underside of the trailer along which one or more rear axles of the trailer are configured to slide to facilitate rear axle adjustment.

12. The freight vehicle according to claim 1, wherein the trailer lift system comprises an axle securing system configured to secure one or more rear axles of the trailer when lifting the trailer.

13. The freight vehicle according to claim 12, wherein the axle securing system comprises one or more axle securing arms configured to apply upward force to the one or more rear axles of the trailer or to one or more rear wheels of the trailer to facilitate securement of the one or more rear axles of the trailer when lifting the trailer.

14. The freight vehicle according to claim 1, further comprising:

one or more processors; and one or more hardware storage devices storing instructions that are executable by the one or more processors to configure the freight vehicle to:

autonomously connect to or lift a portion of a trailer while in the road traversal mode;

autonomously switch between the road traversal mode and the rail traversal mode while connected to or lifting the trailer to autonomously transport the trailer over at least a roadway and a railway; and/or autonomously disconnect from or lower the portion of the trailer while in the road traversal mode.

15. A freight system comprising:

a plurality of freight vehicles according to claim 1, including a first freight vehicle and a second freight vehicle;

a communication system configured to communicate with each of the plurality of freight vehicles;

one or more processors;

one or more hardware storage devices storing instructions that are executable by the one or more processors to configure the one or more processors to control, through the communication system, one or more acts of one or more of the plurality of freight vehicles including attaching of the one or more freight vehicles to a trailer, and movement of one or more of the plurality of freight vehicles.

16. The freight system according to claim 15, wherein the first freight vehicle comprises a connection system configured to receive a kingpin of a trailer or connector provided toward a front end of the trailer, wherein the freight vehicle is configured to operate in the road traversal mode and the rail traversal mode while connected to the trailer via the connection system, and wherein the second freight vehicle comprises a trailer lift system configured to lift at least a portion of a tail end of a trailer or a portion of the trailer that is opposite from an end of the trailer that has a kingpin of the trailer, wherein the freight vehicle is configured to operate in the road traversal mode and the rail traversal mode while lifting the trailer via the trailer lift system.

17. A method of moving freight including:

providing the freight system according to claim 15; and controlling, through the communication system, one or more acts of one or more of the plurality of freight vehicles including attaching of the one or more freight vehicles to a trailer; and movement of one or more of the plurality of freight vehicles.

18. The freight vehicle according to claim 1, wherein the motor system includes a road motor system configured to drive the set of road wheels to facilitate road traversal, wherein in the road traversal mode, the road motor system drives the set of road wheels to facilitate traversal of the road, and wherein the motor system includes a rail motor system, the rail motor system being configured to drive the set of rail wheels to facilitate rail traversal, wherein in the rail traversal mode, the rail motor system drives the set of rail wheels to facilitate traversal of the rail.

19. A freight vehicle, comprising:
a set of road wheels configured for road traversal;
a set of rail wheels configured for rail traversal, the set of rail wheels being separate from the set of road wheels;
an actuation system configured to modify a relative positioning of the set of road wheels and the set of rail wheels to facilitate operation of the freight vehicle according to a plurality of operational modes, the plurality of operational modes comprising:
  a road traversal mode wherein the actuation system causes the set of road wheels to contact a road and causes the set of rail wheels to refrain from contacting the road, and wherein a motor system drives the set of road wheels to facilitate traversal of the road, and
  a rail traversal mode wherein the actuation system causes the set of rail wheels to contact a rail and causes the set of road wheels to refrain from contacting the rail, and wherein the motor system drives the set of rail wheels to facilitate traversal of the rail; and
a trailer lift system configured to lift at least a portion of a tail end of a trailer or a portion of the trailer that is opposite from an end of the trailer that has a kingpin of the trailer, wherein the freight vehicle is configured to operate in the road traversal mode and the rail traversal mode while lifting the trailer via the trailer lift system,
wherein the trailer lift system comprises an axle securing system configured to secure one or more rear axles of the trailer when lifting the trailer, and
wherein the axle securing system comprises one or more axle securing arms configured to apply upward force to the one or more rear axles of the trailer or to one or more rear wheels of the trailer to facilitate securement of the one or more rear axles of the trailer when lifting the trailer.

20. The freight vehicle according to claim 19, wherein the axle securing system comprises one or more axle securing arms configured to apply upward force to the one or more rear axles of the trailer to facilitate securement of the one or more rear axles of the trailer when lifting the trailer.

21. The freight vehicle according to claim 19, wherein the axle securing system comprises one or more axle securing arms configured to apply upward force to one or more rear wheels of the trailer to facilitate securement of the one or more rear axles of the trailer when lifting the trailer.

22. The freight vehicle according to claim 19, wherein the motor system includes a road motor system configured to drive the set of road wheels to facilitate road traversal, wherein in the road traversal mode, the road motor system drives the set of road wheels to facilitate traversal of the road, and wherein the motor system includes a rail motor system, the rail motor system being configured to drive the set of rail wheels to facilitate rail traversal, wherein in the rail traversal mode, the rail motor system drives the set of rail wheels to facilitate traversal of the rail.

23. The freight vehicle according to claim 19, further comprising:
one or more processors; and
one or more hardware storage devices storing instructions that are executable by the one or more processors to configure the freight vehicle to:
autonomously connect to or lift a portion of a trailer while in the road traversal mode;
autonomously switch between the road traversal mode and the rail traversal mode while connected to or lifting the trailer to autonomously transport the trailer over at least a roadway and a railway; and/or
autonomously disconnect from or lower the portion of the trailer while in the road traversal mode.

24. A freight system comprising:
a plurality of freight vehicles according to claim 19, including a first freight vehicle and a second freight vehicle;
a communication system configured to communicate with each of the plurality of freight vehicles;
one or more processors;
one or more hardware storage devices storing instructions that are executable by the one or more processors to configure the one or more processors to control, through the communication system,
  one or more acts of one or more of the plurality of freight vehicles including attaching of the one or more freight vehicles to a trailer, and
  movement of one or more of the plurality of freight vehicles.

25. A method of moving freight including:
providing the freight system according to claim 24; and
controlling, through the communication system,
  one or more acts of one or more of the plurality of freight vehicles including attaching of the one or more freight vehicles to a trailer; and
movement of one or more of the plurality of freight vehicles.

* * * * *